Nov. 21, 1972  J. S. SMATKO  3,703,414
LOW-GASSING BATTERY SEPARATOR AND METHOD OF PRODUCTION
Filed Sept. 8, 1970
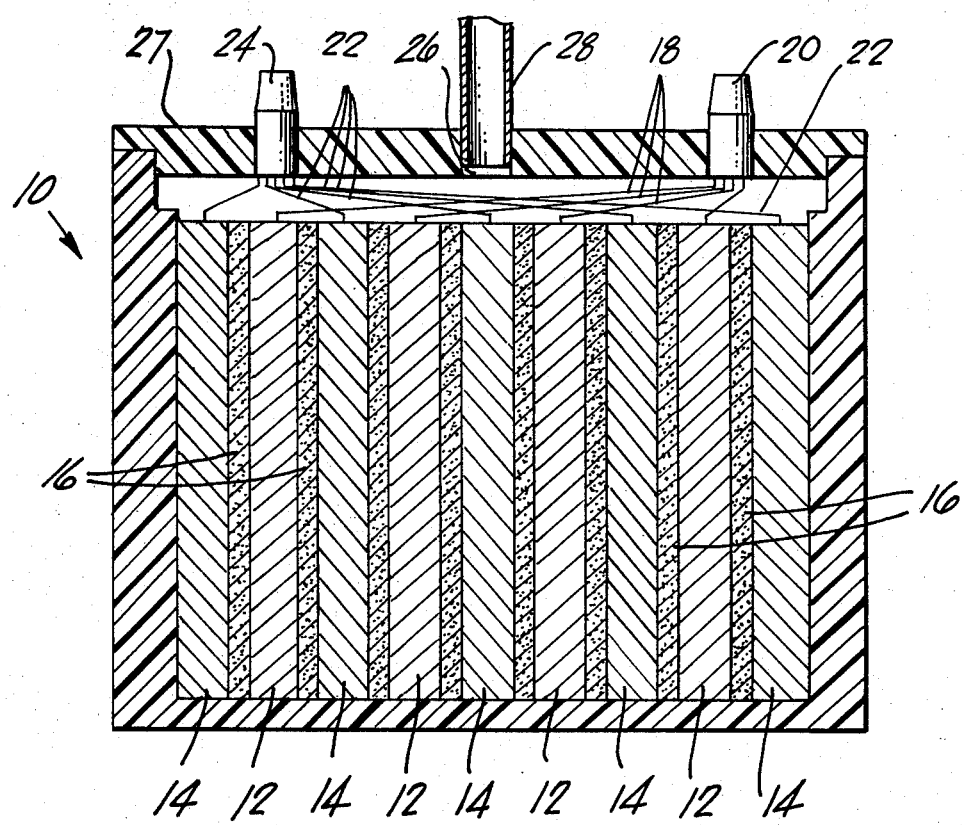
INVENTOR.
JOSEPH S. SMATKO
BY
Max Gelden
- ATTORNEY -

United States Patent Office 3,703,414
Patented Nov. 21, 1972

3,703,414
LOW-GASSING BATTERY SEPARATOR AND
METHOD OF PRODUCTION
Joseph S. Smatko, Santa Barbara, Calif., assignor to
McDonnell Douglas Corporation, Santa Monica, Calif.
Filed Sept. 8, 1970, Ser. No. 70,400
Int. Cl. H01m 43/02
U.S. Cl. 136—30
26 Claims

ABSTRACT OF THE DISCLOSURE

Production of inorganic porous sintered battery separator substantially reducing formation of gas when in contact with a zinc electrode, and permitting long cycle life of a high energy density battery such as a silver-zinc battery, produced according to a preferred embodiment by firing or sintering a compacted magnesium silicate-iron silicate composition, particularly the mineral olivine, at temperature ranging from about 1,000° C. to about 1,400° C. in a carbon monoxide-carbon dioxide atmosphere, to produce a porous sintered membrane consisting essentially of magnesium silicate and iron silicate, e.g., a sintered porous olivine separator, the iron content thereof being substantially entirely in ferrous form.

This invention relates to batteries, particularly high energy density batteries and is especially concerned with the production of improved inorganic membranes or separators for use in such batteries, especially a high energy density battery containing a zinc electrode, such separator having substantially reduced tendency to cause gassing when in contact with a zinc electrode, thereby permitting production of hermetically sealed batteries of this type, which can operate as a secondary battery over a large number of charge-discharge cycles efficiently, with novel procedure for producing such separators, and with improved battery constructions embodying such improved separators.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important airborne applications, such high energy density batteries have many other applications such as in portable tools and appliances, television, radio and record players, engine starting, portable X-ray units and the like.

In high energy density batteries such as silver-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in Patent No. 3,446,668. Such inorganic separator is in the form of a sintered porous member composed of magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries when such batteries or cells are vented, it has been found from experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the battery case. Analysis of the gas generated in such batteries shows the major component to be hydrogen.

Tests have been devised to determine the gassing potential of the various cell components. One such test is based on mixing a predetermined weight of test material, such as particulate sintered magnesium silicate-iron silicate separator material produced according to the above patent, with a pre-established amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

Attempts were made to de-activate the gassing sites with sulfide treatment or with quinoline, but these failed to yield a long term and satisfactory solution to the gassing problem of the magnesium silicate-iron silicate separator material. Other attempts involved the application of a thin coating of a non-gassing ceramic material such as zirconia on the sintered magnesium silicate-iron silicate, or olivine, separator member of the above patent. At best, this latter technique served only to delay to a minor extent the onset of significant gassing when such coated separator was used in a silver-zinc cell, but did not provide a satisfactory solution to the problem.

It was found that after sintering or firing the raw material olivine in a gas fired kiln to produce the sintered porous separator, according to the procedure of the above patent, 3,446,668, the original off-white colored olivine changed to a deep red-brown color, indicating partial decomposition and the oxidation of a portion of the ferrous iron in the olivine to $Fe_2O_3$ and small amounts of $Fe_3O_4$, depending upon the firing conditions. The presence of ferric compounds in the resulting separator is noted in the patent. It was found that these higher oxidation states of the iron in the olivine, produced upon firing the olivine in a gas-fired kiln in the presence of combustion gases and air, when in contact with zinc promotes dissolution of the zinc with liberation of hydrogen gas at marked rates.

It was discovered according to the present invention that if the magnesium silicate-iron silicate composition, or olivine, e.g., in compacted form, is sintered or fired in a controlled atmosphere containing a reducing gas, particularly a combination of carbon monoxide and carbon dioxide (hereinafter also referred to as "$CO/CO_2$") gases, or an inert gas, under conditions to maintain the iron content of the starting mixture in the ferrous form with substantially no ferric oxides produced, the resulting sintered magnesium silicate-iron silicate separators have substantially lower gassing rates when in contact with a zinc electrode as compared to separators produced from the same starting materials but by sintering in the presence of oxidizing gases including air, according to the procedure of the above patent.

Briefly then, the process for producing a low-gassing battery separator when employed with a zinc electrode, comprises, as the essential feature, firing or sintering a magnesium silicate-iron silicate composition at temperatures ranging from about 1,000° C. to about 1,400° C. in a reducing or inert gas atmosphere, a particularly effective reducing gas atmosphere for this purpose being a properly balanced mixture of carbon monoxide and carbon dioxide, hereinafter also denoted a $CO/CO_2$ atmosphere, and an effective inert gas atmosphere being argon. In view of the marked effectiveness of the above-noted $CO/CO_2$ firing atmosphere for purposes of the invention, the invention will be described below chiefly in connection with the application of such reducing atmosphere in the novel firing operation hereof.

In accordance with the invention, it has been found that magnesium silicate-iron silicate porous separators can be produced either by subjecting a compacted starting mixture of olivine or equivalent synthetic mixture described more fully hereinafter, to firing or sintering in a controlled or balanced $CO/CO_2$ atmosphere, or alternatively a magnesium silicate-iron silicate separator previously fired or sintered in an oxidizing atmosphere can be refired or resintered in a $CO/CO_2$ atmosphere, to provide improved magnesium silicate-iron silicate separators, the iron content of which is in the ferrous form, and having the resulting important property of being low-gassing when in contact with a zinc electrode in a battery, to provide a battery having a long cycle life yet which can be hermetically sealed.

In carrying out the invention for obtaining the improved magnesium silicate-iron silicate separator hereof, a synthetic mixture of suitable iron-bearing, magnesium-bearing and $SiO_2$-bearing materials are mixed generally in proportions of about 5 to about 40% of the iron-bearing material or compound calculated as ferrous oxide (FeO), about 5 to about 55% of the magnesium-bearing material or compound calculated as MgO, and about 30 to about 45% silica ($SiO_2$).

Suitable iron-bearing materials or iron compounds which can be employed include, for example, ferrous or ferric sulfate, ferrous or ferric chloride, or ferrous or ferric oxide, or mixtures of ferrous or ferric compounds such as a mixture of ferrous and ferric sulfates.

Suitable magnesium-bearing materials or magnesium compounds that can be employed are for example magnesium carbonate, magnesium sulfate, magnesium chloride and magnesium silicate.

Alternatively, the iron and magnesium compounds employed can be in the form of their oxides.

As a source of suitable $SiO_2$-bearing material, there can be employed for example, flint, silica, sand diatomaceous earth or magnesium silicate.

Alternatively, the starting material can be the naturally occurring mineral olivine, a magnesium, iron silicate, one representative form of which is composed of 41.1% $SiO_2$, 49.3% MgO and 6% FeO.

The starting mixture, either synthetically produced as noted above, or employing the mineral olivine, is first compacted, e.g., at pressure ranging from about 2,000 to about 10,000 p.s.i. into the form or shape of the separator desired, e.g., in the form of a disc, or plaque.

Such compressed separator members or discs are then subjected to sintering or firing at temperature ranging from about 1,000° C. to about 1,400° C. in a controlled atmosphere of $CO/CO_2$ according to the invention, e.g., in an electric furnace, generally for a period ranging from about 15 minutes to about 8 hours. In preferred practice, the firing or sintering temperature ranges from about 1,100° C. to about 1,300° C. for times of about 15 minutes to about 3 hours.

The carbon monoxide-carbon dioxide atmosphere in which firing is carried out according to the invention can contain varying amounts of carbon monoxide with respect to carbon dioxide, depending primarily on the temperature of operation. Thus, the volume ratio of CO to $CO_2$ can range from about 2 to 1 to about 0.5 to 1. When carrying out the firing operation in the preferred temperature range of about 1,100° C. to about 1,300° C., a carbon monoxide-carbon dioxide atmosphere having a ratio of CO to $CO_2$ of 1 to 1 by volume has been found particularly effective.

During the firing or sintering operation in the above controlled atmosphere which as previously noted, takes place over a period of about 15 minutes to about 8 hours, usually from about 15 minutes to about 3 hours, the iron oxide content, generally in the form of ferrous oxide in the starting material, such as olivine, is maintained in the ferrous form with substantially none of such iron content being converted to the higher valence ferric species, and the resulting sintered separators are generally in the form of solid solutions of magnesium silicate and ferrous silicate. The resulting magnesium silicate-iron silicate separators formed upon sintering according to the invention can have a composition ranging from about 10 to about 95 mol percent magnesium silicate and about 90 to about 5 mol percent ferrous silicate, preferably ranging from about 85 to about 95 mol percent magnesium silicate and about 15 to about 5 mol percent ferrous silicate.

Following the firing or sintering operation in the controlled $CO/CO_2$ atmosphere, the separators are maintained in this reducing atmosphere in the furnace during the cooling period down to about 500° C. to about 300° C. The reason for this is that at these high temperatures of about 1,400° C. down to about 300° C., at least some of the ferrous content of the fired separators would be converted to ferric oxides in the absence of such reducing atmosphere, which is specifically avoided according to the present invention in order to obtain the improved low-gassing separators, and hence such cooling between about 1,400 or about 1,300° C. down to about 500° C. to 300° C. is carried out in the same controlled $CO/CO_2$ atmosphere present during the firing or sintering operation. Thereafter, the separators are cooled rapidly. Upon reaching about 500° C. one may turn off the $CO/CO_2$ and substitute an inert gas such as argon or nitrogen down to a temperature of 300° C. and then air may be admitted.

In addition to having the desired low-gassing characteristics when in contact with a zinc electrode, the improved magnesium silicate-iron silicate separators of the invention otherwise have substantially the same advantageous properties of the magnesium silicate-iron silicate porous separators produced as disclosed in the above patent. Thus, the magnesium silicate-iron silicate separators of the present invention have a high transverse strength or modulus of rupture ranging from about 4,000 to about 10,000 p.s.i., a porosity ranging from about 10% to about 50%, and good resistance to alkali.

Where according to the above noted alternative embodiment, a magnesium silicate-iron silicate separator prefired or previously sintered in an oxidizing atmosphere or air at temperature of about 800° C. to about 1,400° C., according to the procedure of the above patent, is refired or resintered in a reducing gas atmosphere according to the present invention, the same temperature and other conditions including the maintenance of the $CO/CO_2$ atmosphere during such refiring are followed as in the case of the above described firing under controlled conditions of a previously unfired starting mixture or unfired olivine. By so refiring the previously sintered magnesium silicate-iron silicate, e.g., olivine, separator, in a controlled atmosphere of $CO/CO_2$, the ferric forms of iron present in the previously sintered separators are reduced to the ferrous forms, also rendering the resulting magnesium silicate-iron silicate separators low gassing in the presence of certain electrodes, particularly the zinc electrode. The other properties of the resulting separators including strength, porosity, and resistance to alkali, are otherwise substantially the same as those produced from an unfired starting mixture such as unfired olivine, which is subjected to firing in the reducing atmosphere of the invention procedure.

The magnesium silicate-iron silicate separator material produced according to the invention by firing in a controlled atmosphere, and converted or granulated to a ground particulate form, can be employed as inorganic separator material used in flexible separators. These include, for example, the flexible separators described in the copending application, Ser. No. 676,224, filed Oct. 18, 1967 of F. C. Arrance, et al., now abandoned and consisting, for example, of a porous inorganic material, which can be the above noted magnesium silicate-ferrous silicate improved separator material of the present invention, and a minor portion of a water coagulable organic fluorocarbon polymer such as a vinylidene fluoride polymer, to bond the particles of the inorganic material.

Also, the above noted particulate magnesium silicate-iron silicate separator material produced according to the invention can be employed as the inorganic material in the flexible separators described in the copending application, Ser. No. 676,223, filed Oct. 18, 1967, of F. C. Arrance, now Pat. No. 3,542,596 and consisting for example of a major portion of such inorganic material, e.g., the above noted magnesium silicate-ferrous silicate separator material of the invention, a minor portion of potassium titanate, and a minor portion of a cured organic polymer such as polyphenylene oxide as bonding agent.

Further, the improved inorganic separator material of the present invention can be applied in the copending application, Ser. No. 707,808, filed Feb. 23, 1968, of F. C. Arrance et al., now abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, aluminosilicate sheets, and the like, a film comprising a mixture of a magnesium silicate-ferrous silicate separator material according to the invention, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate.

Also, the particulate magnesium silicate-iron silicate improved separator material of the invention can be employed as the inorganic material in producing the flexible microporous separator film described in copending application, Ser. No. 27,577, filed Apr. 13, 1970, by M. P. Strier and J. S. Smatko, which consists essentially of an organic polymer such as polytetrafluoroethylene, having particles of such inorganic material uniformly distributed in said film.

Although a $CO/CO_2$ atmosphere for the firing operation according to the invention has been found particularly effective as a controlled atmosphere, since the proportion of carbon monoxide to carbon dioxide in such mixture can be readily balanced so as to prevent formation of $Fe_2O_3$ or $Fe_3O_4$ by oxidation, or the formation of metallic Fe by reduction as result of the presence of too great a proportion of CO reducing gas, any other reducing gas atmosphere which can be so controlled or balanced to maintain the iron content of the magnesium silicate-iron silicate separator material in the ferrous form, without formation of ferric compounds or elemental iron can be employed. Thus, for example, there can be employed as reducing atmosphere for the firing operation a mixture of hydrogen and water vapor, the proportions of hydrogen and water vapor being controlled, as in the case of the proportions of carbon monoxide and carbon dioxide in the above noted $CO/CO_2$ preferred atmosphere, to prevent oxidation of the ferrous content of the starting mixture to ferric compounds, or the reduction thereof to elemental iron.

Also, in place of a reducing gas atmosphere, there can be alternatively employed an inert gas atmosphere, so that the firing of the magnesium silicate-iron silicate composition can take place for example in argon, nitrogen, helium, and other inert gases.

The following are examples illustrating practice of the invention:

EXAMPLE 1

Balsam Gap natural olivine (A) having the composition 47–49% MgO, 7–9% FeO and 30–41% $SiO_2$, and prefired Balsam Gap olivine (B) which is prefired in a gas furnace with the products of combustion in contact with it and produced substantially according to the procedure described in the above Patent 3,446,668, by firing the Balsam Gap olivine at a temperature of about 1,300° C., in the furnace combustion gases, are provided. Both of these starting mixtures are compacted at about 8,000 p.s.i. into flat members of about 0.033 inch thick, and the respective members formed of the two compositions, are each subjected to firing in (1) a mixture of a 1 to 1 volume ratio of CO and $CO_2$ at 1225° C. for 1.5 hours, (2) argon at 1225° C. for 2 hours and (3) air at 1,100° C. for 6 hours. In those tests employing a $CO/CO_2$ mixture, following the firing operation, the last mentioned mixture is scavenged from the furnace chamber with pure argon at about 550° C., and the furnace cooled rapidly to about 250° C., in order to avoid formation of any significant amounts of iron compounds or elemental iron, other than ferrous iron. Corresponding samples of the two starting materials are not fired at all.

Following the above noted firing operations in the above various atmospheres, the various samples subjected to such firing are granulated and the materials in particulate form are respectively mixed with 68.4% zinc powder by weight of the mixture, and the respective mixtures compressed at about 18,000 p.s.i. into pellets, and such pellets contacted under the same conditions with 30% KOH solution at ambient temperature. Also, the unheated samples of the two starting materials are similarly formed into pellets and also contacted with the same concentration KOH solution. Further, a zinc blank is pelleted in the same manner and contacted with the same concentration KOH solution. The gas produced in each test is collected and measured with respect to time.

The materials tested, firing atmosphere, color of the materials both before and after heating, and amount of the gas collected at various specified times from the reaction of the respective pellets contacted with the KOH solution, are set forth in Table I below, the starting material indicated as (A) being the above noted initially unfired Balsam Gap natural olivine, and the starting material marked (B) being the above noted prefired Balsam Gap olivine material produced according to Patent 3,446,668.

TABLE I

| Starting material | Firing atmosphere | Color | | Gas collected (cc.) | | | | |
|---|---|---|---|---|---|---|---|---|
| | | Before heating | After heating | 1 hr. | 2 hrs. | 6 hrs. | 24 hrs. | 48 hrs. |
| Balsam Gap Olivine (A) | Unheated | Off-white | | 2.0 | 3.3 | 11.1 | 45 | 83 |
| Do | CO/CO₂ | do | Off-White | 4.4 | 6.9 | 14.9 | 41 | 66 |
| Do | Argon | do | do | 8.9 | 13.1 | 26.4 | 62 | 91 |
| Balsam Gap Olivine (B), prefired | Not reheated | Red brown | | 66 | 108 | 220 | 431 | 559 |
| Do | CO/CO₂ | do | Off-White | 1.1 | 2.4 | 8.1 | 30 | 53 |
| Do | Argon | do | Very deep slate gray | 5.9 | 13.7 | 41 | 117 | 171 |
| Balsam Gap Olivine (A) | Air | Off-white | Red-brown | 114 | 154 | 252 | 467 | |
| Balsam Gap Olivine (B), prefired | Air | Red-brown | do | 87 | 139 | 260 | 522 | |
| Zinc blank | | | | 0.0 | 0.0 | 0.3 | 1.5 | 3.0 |

The results from the above table show remarkably reduced gassing rates for both the Balsam Gap olivine material (A) and the Balsam Gap olivine prefired material (B) produced according to the above patent, in the presence of zinc in alkali. When such materials are fired in the $CO/CO_2$ atmosphere according to the invention, as compared to the Balsam Gap olivine prefired material (B) produced according to the patent but which is not reheated or refired according to the invention, in the presence of the zinc in alkali. Thus, for example, note the 53 cc. of gas and the 66 cc. of gas collected respectively after 48 hours from the separator materials formed when the prefired olivine (B) and the unfired olivine (A) are subjected to the $CO/CO_2$ reducing atmosphere, as contrasted to the 559 cc. of gas collected after 48 hours from the prefired olivine sample (B) produced according to the above patent and not reheated, in the presence of zinc and alkali. Note in this respect that the samples of the prefired olivine (B) changed in color from red-brown to off-white following heating in the reduced atmosphere, indicating the conversion of the ferric iron content of the prefired material before heating in the $CO/CO_2$ atmosphere, to ferrous iron following such heating.

The above table also shows that in the presence of the inert argon atmosphere a marked reduction of gassing occurred both with respect to the previously unfired olivine material (A), as well as the prefired olivine (B), in contrast to the amount of gassing produced by the prefired olivine material (B) produced according to the above patent, but which was not reheated at all. Note that the results however with respect to the use of the reducing $CO/CO_2$ atmosphere are somewhat superior to those produced employing the inert argon atmosphere.

It will be noted further that the initial Balsam Gap olivine material (A) and which is unheated, shows low gassing because the iron content of such initial material is essentially in the ferrous form.

On the other hand, it is noted that when both the olivine material (A) and the prefired olivine material (B) are heated in air, in both cases after 24 hours, the amount of gas collected, 467 cc. and 522 cc., respectively, are even greater than the 431 cc. for the prefired olivine material (B) produced according to the above patent, and which is not reheated at all.

The minimal gassing rates for the zinc blank shown in the table above clearly indicate that the substantial gassing taking place where olivine or a magnesium silicate-iron silicate composition is in contact with the zinc, results from the reaction of the zinc with the ferric iron content of the olivine or of the magnesium silicate-iron silicate composition, and which gassing is substantially reduced according to the invention and shown in the table above, by firing the olivine material (A) or the prefired olivine material (B) in a reducing atmosphere such as a properly balanced $CO/CO_2$ mixture.

EXAMPLE 2

Four types of battery separators are incorporated in a silver-zinc battery and the respective batteries subjected to cycling to determine the number of cycles through which each of these batteries can be operated before gassing occurs.

The four types of separators tested are (1) the Balsam Gap olivine prefired separator described in Example 1 above produced according to the above patent and which is not reheated according to the invention, (2) the same Balsam Gap olivine prefired separator, but which is refired in the $CO/CO_2$ atmosphere, as described above in Example 1, (3) the Balsam Gap olivine separator made directly by firing in a $CO/CO_2$ atmosphere as described in Example 1, and (4) Balsam Gap olivine prefired separator as produced according to the above patent and described in Example 1, with a 2 mil coating of a sprayed-on zirconia composition having a polyphenylene oxide resin binder.

The respective four types of separators noted above are incorporated in four separate multiplate nominal 5 ampere-hour batteries illustrated in the accompanying drawing. The battery, indicated at 10, contains four zinc electrodes 12, alternately disposed in relation to five silver electrodes 14, with a plurality of separators 16, such as the type (3) separator described above, each positioned between adjacent zinc and silver electrodes. The leads 18 from the zinc electrodes 12 are collectively connected to the terminal 20, and the leads 22 from the silver electrodes 14 are collectively connected to the terminal 24. A port 26 is provided in the top of the battery and has connected thereto a tube 28 in turn connected to a collection container (not shown) for collection and measurement of the collected gas generated in the battery.

The four batteries described above, each containing the respective four types of separators (1), (2), (3) and (4), noted above, are charged and discharged using the same cycling regime for each battery, employing in each case 1 hour charge and ½ hour discharge per cycle, at a 30% depth of discharge.

The cell having the type (1) separators noted above commences to generate collectible gas as soon as the 12th cycle. The battery containing the type (4) separators shows collectible gas by the 52nd cycle. The batteries with the type (2) and type (3) separators produced by firing in a $CO/CO_2$ atmosphere according to the invention, do not gas at all, even beyond the 400th cycle.

The above results show that the batteries containing the magnesium silicate-iron silicate or olivine solid solution separators fired in a $CO/CO_2$ atmosphere according to the invention can be hermetically sealed without danger of rupture due to the markedly reduced tendency of such batteries to generate gas even over greatly extended cycling operations.

EXAMPLE 3

The procedure of Example 2 is repeated except that the type (2) and type (3) separators are produced by firing in an argon atmosphere as described in Example 1 above in place of the $CO/CO_2$ atmosphere.

Results similar to those noted in Example 2 above are obtained, that is markedly reduced gassing of the batteries with the type (2) and type (3) separators fired in the argon atmosphere, as contrasted to the batteries containing the type (1) and type (4) separators.

EXAMPLE 4

The procedure of Example 2 is repeated, except that in place of the silver electrodes, there are employed nickel oxide electrodes, providing multiplate nickel-zinc batteries.

The results obtained with respect to marked reduction of gassing in relation to the type (2) and type (3) separators in these nickel-zinc batteries is similar to that obtained in Example 2 with respect to the multiplate silver-zinc batteries.

Although the improved magnesium silicate-iron silicate separators produced according to the invention are particularly advantageous when employed with a zinc electrode to reduce gassing tendency as compared to the magnesium silicate-iron silicate separators of the above patent, it will be noted that the improved magnesium silicate-iron silicate separators of the present invention can also be utilized in high energy density batteries containing electrodes other than zinc electrodes, for example in a nickel-cadmium or silver-cadmium battery, with advantageous results.

In view of the foregoing, it is seen that the invention provides procedure for producing low-gassing efficient separators, particularly when employed with a zinc electrode, permitting the provision of hermetically sealed long-lived secondary batteries, such as efficient sealed silver-zinc and nickel-zinc batteries.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A process for producing a low-gassing battery separator when employed with a zinc electrode, which comprises sintering a material which consists essentially of a compacted magnesium silicate-iron silicate composition at temperature ranging from about 1,000° C. to about 1,400° C. in an atmosphere consisting of a mixture of carbon monoxide and carbon dioxide, the proportion of carbon monoxide to carbon dioxide in said mixture being balanced to maintain the iron content of said composition in the ferrous form without formation of ferric compounds or elemental iron.

2. The process as defined in claim 1, wherein said magnesium silicate-iron silicate composition is olivine.

3. A low-gassing battery separator when employed with a zinc electrode, in the form of a porous membrane comprising a sintered composition consisting essentially of magnesium silicate and iron silicate, said iron silicate being present substantially entirely in the ferrous form, said separator produced by the process of claim 1.

4. The process as defined in claim 1, wherein said sintering is carried out at temperatures ranging from about 1,100° C. to about 1,300° C. for a period ranging from about 15 minutes to about 8 hours.

5. A process for producing a low-gassing battery separator when employed with a zinc electrode, which comprises sintering a material which consists essentially of a compacted magnesium silicate-iron silicate composition at temperature ranging from about 1,000° C. to about 1,400° C. in a balanced atmosphere which consists essentially of a $CO/CO_2$ mixture having a ratio of CO to $CO_2$ ranging from about 2 to 1 to about 0.5 to 1, by volume, under conditions to maintain the iron content of said composition in the ferrous form without formation of ferric compounds or elemental iron.

6. The process as defined in claim 5, wherein said sintering is carried out at a temperature ranging from about 1,100° C. to about 1,300° C. for a period of from about 15 minutes to about 8 hours.

7. The process as defined in claim 5, said composition consisting essentially of about 5 to about 40% iron-bearing material calculated as FeO, about 5 to about 55% magnesium-bearing material calculated as MgO and about 30 to about 45% of silica ($SiO_2$).

8. The process as defined in claim 7, wherein said iron-bearing material is FeO and said magnesium-bearing material is MgO.

9. The process as defined in claim 5, wherein said magnesium silicate-iron silicate composition is olivine.

10. The process as defined in claim 6, wherein said magnesium silicate-iron silicate composition is olivine.

11. The process as defined in claim 10, wherein said sintering is carried out for a period of from about 15 minutes to about 3 hours.

12. The process as defined in claim 5, said composition being a prefired magnesium silicate-iron silicate.

13. The process as defined in claim 12, wherein said composition is olivine.

14. The process as defined in claim 6, said composition being a prefired olivine composition.

15. The process as defined in claim 10, wherein said $CO/CO_2$ atmosphere consists essentially of a 1 to 1 volume mixture of CO and $CO_2$.

16. The process as defined in claim 9, wherein said $CO/CO_2$ atmosphere consists essentially of a 1 to 1 volume mixture of CO and $CO_2$.

17. A low-gassing battery separator when employed with a zinc electrode, in the form of a porous membrane comprising a sintered composition consisting essentially of magnesium silicate and iron silicate, said iron silicate being present substantially entirely in the ferrous form, said separator produced by the process of claim 5.

18. A battery separator as defined in claim 17, said composition being a solid solution consisting essentially of about 10 to about 95 mol percent magnesium silicate, and about 90 to about 5 mol percent ferrous silicate, said separator having a porosity ranging from about 10% to about 50%.

19. A battery separator as defined in claim 18, wherein said composition consists essentially of about 85 to about 95 mol percent magnesium silicate and about 15 to about 5 mole percent ferrous silicate.

20. A battery separator as defined in claim 17, wherein said composition is a sintered solid solution.

21. A flexible battery separator as defined in claim 17, said sintered composition in particulate form being distributed uniformly in a polymeric organic binder.

22. A battery separator as defined in claim 17, wherein said composition is a sintered olivine, the iron content thereof being entirely in ferrous form.

23. In a battery containing a zinc electrode, a low-gassing battery separator as defined in claim 17.

24. In a battery as defined in claim 23, said composition of said separator being a sintered olivine, the iron content thereof being entirely in ferrous form.

25. In a battery as defined in claim 23, said zinc electrode being positioned on one side of said separator and including a silver electrode positioned on the opposite side of said separator.

26. In a battery as defined in claim 24, said zinc electrode being positioned on one side of said separator and including a silver electrode positioned on the opposite side of said separator.

References Cited
UNITED STATES PATENTS

| | | | |
|---|---|---|---|
| 3,554,814 | 1/1971 | Arrance et al. | 136—146 |
| 3,503,734 | 3/1970 | Bell | 75—5 |
| 3,542,596 | 11/1970 | Arrance | 136—146 |

DONALD L. WALTON, Primary Examiner

U.S. Cl. X.R.

136—146